Dec. 23, 1924. 1,520,467
A. D. FRANTZ
CENTRIFUGAL MACHINE
Filed May 31, 1921 3 Sheets-Sheet 1
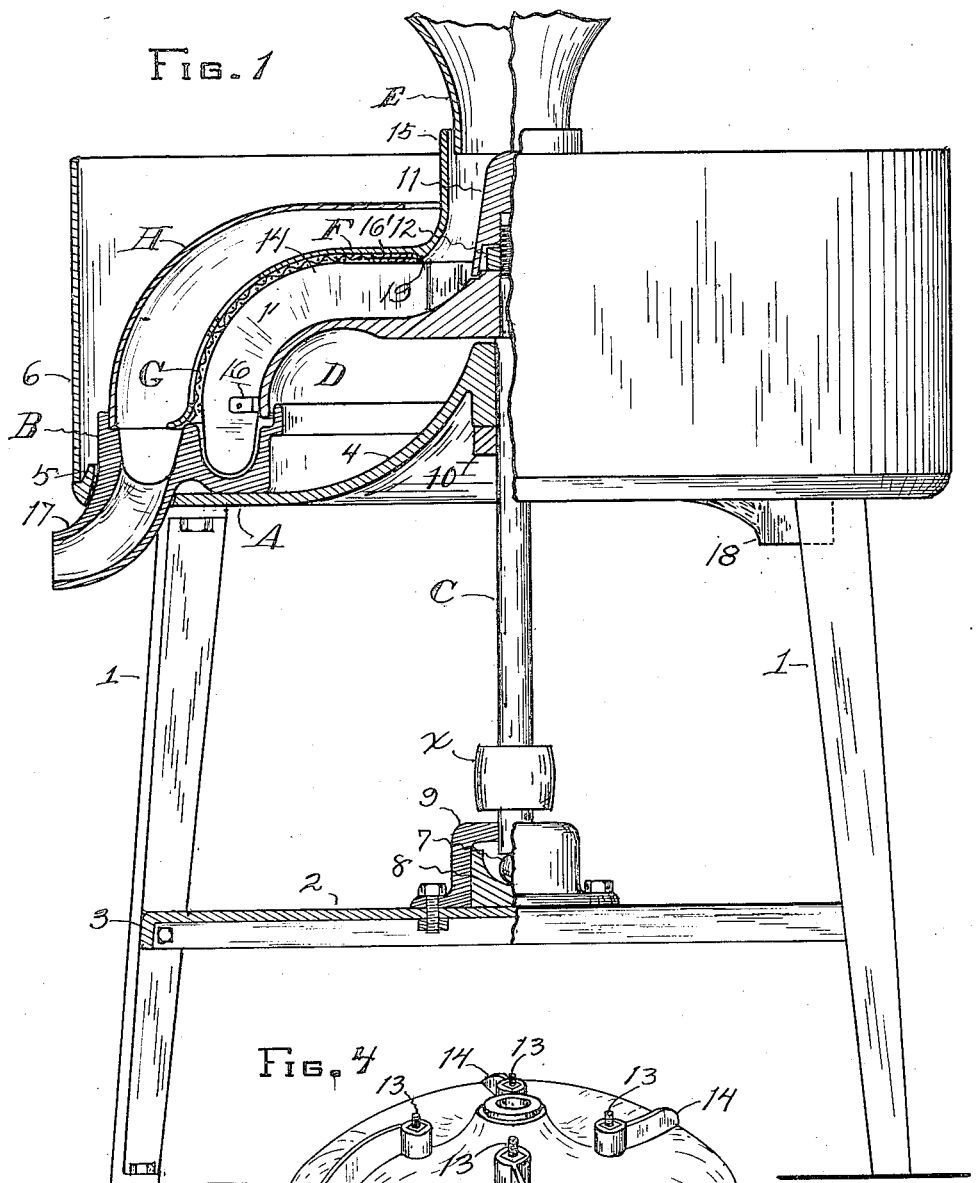

Dec. 23, 1924.　　　　　　　　　　　　　　　　　　　　1,520,467
A. D. FRANTZ
CENTRIFUGAL MACHINE
Filed May 31, 1921　　　　3 Sheets-Sheet 2
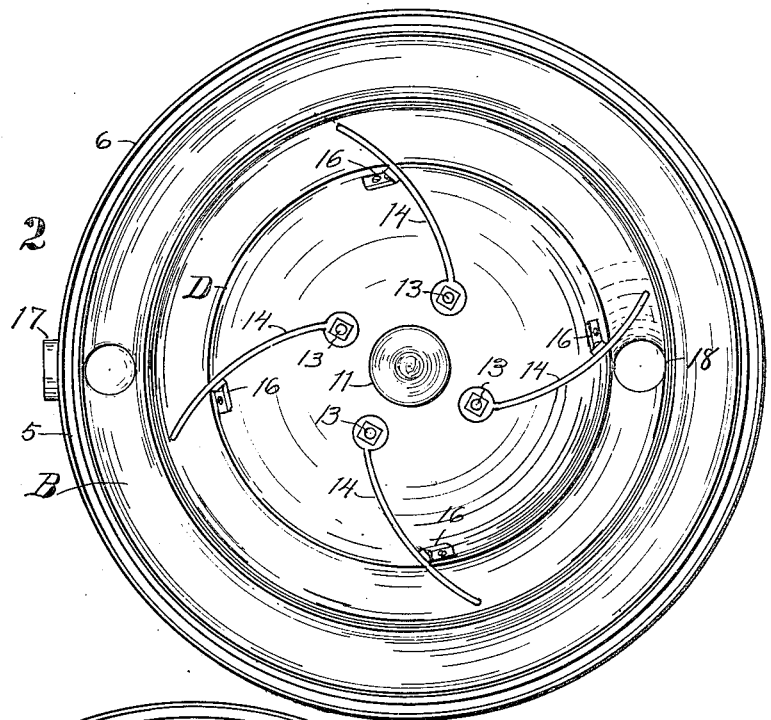
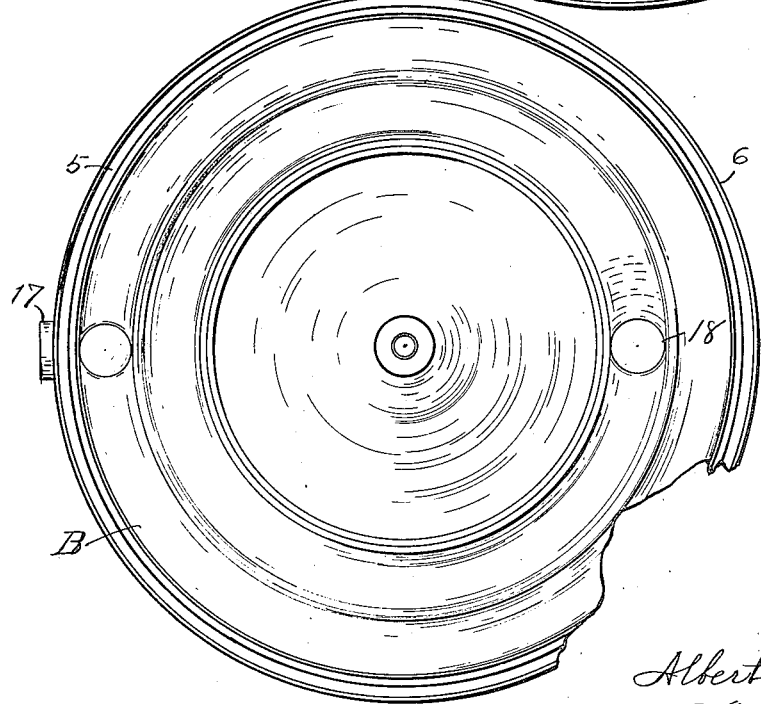
INVENTOR.
Albert D. Frantz
BY Victor E. Randall
atty.

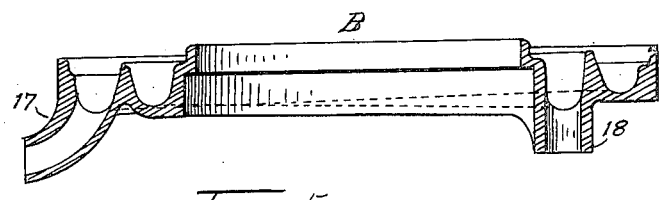
Fig. 5
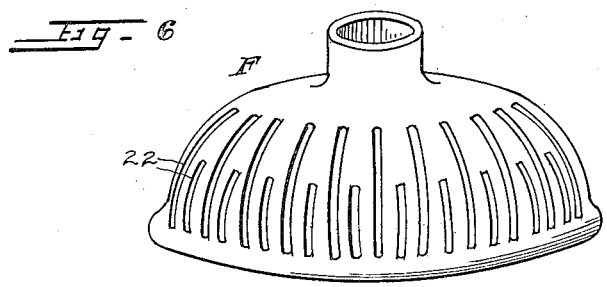
Fig. 6
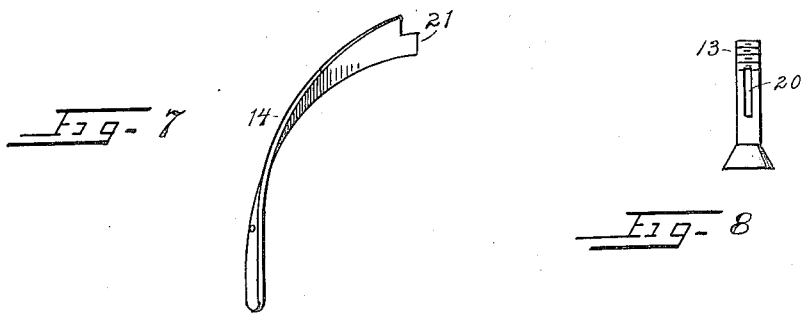
Fig. 7
Fig. 8
INVENTOR
Albert D. Frantz
By Victor E. Randall Patented Dec. 23, 1924.

1,520,467

UNITED STATES PATENT OFFICE.

ALBERT D. FRANTZ, OF BATTLE CREEK, MICHIGAN.

CENTRIFUGAL MACHINE.

Application filed May 31, 1921. Serial No. 473,967.

*To all whom it may concern:*

Be it known that I, ALBERT D. FRANTZ, a citizen of the United States, residing at Battle Creek, in the county of Calhoun and State of Michigan, have invented certain new and useful Improvements in Centrifugal Machines, of which the following is a specification.

My invention relates to centrifugal machines more especially adapted for extracting the juices from crushed or ground fruit and vegetable substances, in which a vertically rotatable driving shaft carries at its upper end an imperforate reverse curved hollow rotor which carries upon its outer surface a series of vertically-disposed curved ejecting blades supporting a fabric strainer and an outer metallic perforate hood, the whole being covered by a stationary open-topped dome, the parts being arranged in such manner that the extracted juices will be delivered into an outer annular drainage trough and the pumice into an inner annular trough from whence the respective products are conveyed from the machine through appropriate spouts.

The objects of my improved machine are, first, to provide distributing blades of such form as will effectively clear the pumice and by-products from the receiving trough; second, to provide and so place a filtering cloth or strainer that the same may be readily placed or removed, will produce better than ordinary results and be inexpensive; third, to afford facilities for the easy assembling of the frame and operating parts; fourth, to firmly and readily secure the distributing blades on the distributing head or rotor; and fifth, to provide a machine of the character, of simple and substantial construction and capable of rendering the most efficient service for the purpose. The foregoing objects I attain by the mechanism illustrated in the accompanying drawings, in which—

Figure 1 is a vertical broken section of my improved centrifugal machine.

Fig. 2 is a plan view of the same with the dome or perforate hood removed.

Fig. 3 is a plan of the machine with the centrifugal operating parts removed.

Fig. 4 is a detail view of the ejecting blades and their attaching means to the rotor or centrifugal head.

Fig. 5 is a transverse section of a double annular receiving pan in alignment through their discharge spouts.

Fig. 6 is a detail vertical elevation of the perforated rotor dome.

Fig. 7 is a side elevation of a clearing blade.

Fig. 8 is a detail view of a slotted stud used to secure the clearing blades to the rotor.

Like marks of reference refer to corresponding parts in the different views, in which the table A, its legs 1, 1, the bottom girt 2 and the end wings 3 bolting with said legs and the cross girt 4 to the table A, constitute the framework of the machine. Said table is formed with a peripheral rim 5, about which a drum or casing 6 is fitted, the inner wall of the rim forming a locating flange for a double annular troughed receptacle B, the purpose of which will be more fully set forth.

Vertically mounted within the frame is the driving shaft or spindle C. This shaft at its lower end rests on a ball 7 within a cupped bearing 8 of a journal housing 9 mounted on the lower cross girt 2, the upper end of the shaft passing through a bearing centrally of top cross girt 4, a collar 10 below said girt keeping the shaft from upper end thrust, the shaft being driven by any suitable or desirable means, a belt pulley $x$ being shown herein. Mounted on the upper end of said shaft an inverted bowl-shaped rotor D is fitted and it is capped with a conical hood 11 which covers a nut 12 of the driving shaft, and also forms a separating point or distributor for material entering the machine from its hopper E. Extending from or fitted to said rotor at regular spaced points a series of studs 13 are provided. These studs have elongated slots 20, near their upper threaded ends into which reduced inner portions 21, of the clearing blades 14, are received. These blades preferably bow in regular curves in the moving direction of the rotor, and also extend below the edge of said rotor and into the inner channel or trough of the double annular receiving trough B of the machine. The space between the rotor and a filtering screen G and its covering dome F is divided by the blades into equal compartments into which the products to be treated enter the machine from a hopper E through the neck 15 of the dome F. The blades 14 on their rear sides are stabilized by means of angle clips 16' extending from said rotor.

Fitted on the studs 13 and resting on the reduced inner ends of the clearing blades 14, spacing caps 16 are placed. These caps afford a seating means for the indrawn portion of the dome F, the latter having suitable apertures through which the threaded ends of the studs pass to receive appropriate fastening nuts, as shown.

Resting on the upper edges of the blades 14 and between said blades and the perforated dome F, the filtering screen G is placed.

The dome F is formed with perforations, as 22, which are elongated and arranged in radiating directions outwardly from the center about its lower outer wall, the upper end of the dome forming a neck into which material to be treated may enter, as aforesaid. The filtering strainer G is by preference of suitable woven or pressed fabric and is placed on the blades 14 and extends low enough to entirely cover the elongated perforations in the cap F and to also receive the upper ends of the studs 13, and when the cap is impressed thereover to lie impressed between the outer edges of said blades and the inner surface of said cap below the edge of a protecting rim or guard 19 formed about said neck opening.

The trough B is formed with two spouts or outlets, an outer spout 17 conveying the juices from the outer trough, an inner spout 18 receiving the pumice or more solid litter directed from the rotor and its blades into the inner trough.

The spout 17 rests within a cut-away or recess formed in the table A, and the spout 18 forms the terminal of a gradual annular or spiral decline of said inner pan, the rotor moving in a direction whereby its blades will sweep the pumice, etc., into and down said decline into its spout opening, from whence it may be conducted from the machine in any suitable manner. A secondary outer spaced dome or hood H is placed over the rotating parts of the machine and rests in a ledge formed on the outer edge of the pan B, as shown. This hood is for the purpose of directing the fluids thrown thereagainst by centrifugal action of the rotor, into the drainage trough.

In operation fruit, for instance, is reduced by crushing or grinding, which process may be performed by mechanism suitable for the purpose, and fed from the hopper E into the compartmental space between the cap F and the rotor D and by rotary motion of said parts is forced by centrifugal action against the fabric strainer G and its outer wall or cap F, thereby liberating its fluids which pass out through the perforations in the lower portion of said cap and against the hood H, from which it runs into the outer trough and is drawn off through the spout 17, whilst the solids are gradually forced downwardly through the action of the heavier incoming products and enter the inner trough and are swept out by means of the depending ends of the blades 14 and fall out through the spout 18.

A machine of the character is easily operated, occupies but little space, is easily cared for, requires but little power to run, and is admirably adapted for extracting cider, wine, etc., in an effective and economical manner, and can be made use of to great advantage by the more limited users.

From the foregoing description of my invention, its mode of operation, advantages and general utility it is believed will be fully comprehended.

Having, therefore, set forth my invention, what I claim as new and desire to secure by Letters Patent, is:

1. The combination in a centrifugal machine, of a rotor comprising an inverted imperforate bowl, a series of vertically-disposed blades radiating from near its center to its outer edge mounted thereon, a perforate cap having a central opening mounted over said blades, a filtering strainer interposed between said blades and said cap, a stationary convex cap spaced above said rotor, and means to operate said rotor.

2. The combination in a centrifugal machine, of a rotor comprising an inverted imperforate bowl, a perforate cap having a central neck opening spaced above said imperforate bowl, a fabric filtering strainer having a central opening coincident with the neck opening of said perforate cap and lining said cap, a series of vertically-curved blades mounted on said bowl and upon the outer edges of which said strainer is adapted to be impressed by said perforate cap, a convex stationary cap spaced above said rotor, and means to operate said rotor.

3. In a centrifugal machine, the combination of a rotor with a series of removable slotted studs mounted thereon, distributing and ejecting blades engaged at their inner ends by said studs and stabilizing clips engaging said blades near their rear outwardly-extending edges, substantially as set forth and described.

4. The combination in a centrifugal machine, of a double annular trough and outlet spouts on both troughs, a dome-shaped covering seating within said outer trough, a rotor carrying spaced distributing and ejecting blades and a perforate cap mounted on said blades, said cap forming a wall above and between said troughs, the lower ends of said blades extending into said inner trough and adapted to clear said trough of the byproducts treated in said machine, substantially as specified.

5. In a centrifugal machine, the combination of an inner trough having an annular decline terminating in a spout opening and rotor blades extending into said trough and moving in a direction to sweep the by-products delivered from said rotor into said trough down said decline and out of said spout.

6. In a centrifugal machine, the combination of a frame having a circular rim with an off-set cut-away portion, a drum or casing mounted about said rim, a double annular trough seated on said frame, the outer of said troughs having a spout seated in the offset portion of said frame, the inner of said spouts having a spout extending below its bottom, and a dome-shaped hood seated on the outer rim of said outer pan.

ALBERT D. FRANTZ.

Witnesses:
 GEO. B. CONRAD,
 FRED WESTELL.